(12) United States Patent
Hirata et al.

(10) Patent No.: US 11,347,115 B2
(45) Date of Patent: May 31, 2022

(54) LIQUID CRYSTAL DISPLAY PANEL

(71) Applicants: SAKAI DISPLAY PRODUCTS CORPORATION, Sakai (JP); SHARP KABUSHIKI KAISHA, Sakai (JP)

(72) Inventors: Mitsuaki Hirata, Sakai (JP); Fumikazu Shimoshikiryoh, Sakai (JP)

(73) Assignees: SAKAI DISPLAY PRODUCTS CORPORATION, Sakai (JP); SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/271,028

(22) PCT Filed: Aug. 31, 2018

(86) PCT No.: PCT/JP2018/032437
§ 371 (c)(1),
(2) Date: Feb. 24, 2021

(87) PCT Pub. No.: WO2020/044557
PCT Pub. Date: Mar. 5, 2020

(65) Prior Publication Data
US 2021/0318580 A1 Oct. 14, 2021

(51) Int. Cl.
*G02F 1/1343* (2006.01)
*G02F 1/1337* (2006.01)
(52) U.S. Cl.
CPC .. *G02F 1/134309* (2013.01); *G02F 1/133742* (2021.01)
(58) Field of Classification Search
CPC .............. G02F 1/134309; G02F 1/133742
See application file for complete search history.

(56) References Cited

U.S. PATENT DOCUMENTS

| 2009/0284703 | A1 | 11/2009 | Shoraku et al. |
| 2015/0036073 | A1 | 2/2015 | Im et al. |
| 2019/0139987 | A1* | 5/2019 | Gan .................. G02F 1/136227 |
| 2020/0241337 | A1 | 7/2020 | Shimoshikiryoh et al. |

FOREIGN PATENT DOCUMENTS

| JP | 2011-085738 A | 4/2011 |
| JP | 5184618 B2 | 4/2013 |
| JP | 2015-031961 A | 2/2015 |
| WO | 2017/047532 A1 | 3/2017 |

\* cited by examiner

*Primary Examiner* — Lucy P Chien
(74) *Attorney, Agent, or Firm* — ScienBiziP, P.C.

(57) ABSTRACT

A liquid crystal display panel includes a first substrate section having a first substrate and pixel electrodes (102). Each pixel electrode (102) includes a bridging portion (102*c*) provided between a first pixel electrode portion (102*a*) and a second pixel electrode portion (102*b*) and linking together the first pixel electrode portion (102*a*) and the second pixel electrode portion (102*b*). A first recess (102*d*) is provided at one side along the width direction of the pixel electrode (102), the first recess (102*d*) extending from one side along the width direction of the pixel electrode (102) toward the bridging portion (102*c*) and being located between the first pixel electrode portion (102*a*) and the second pixel electrode portion (102*b*). A second recess (102*e*) is provided at another side along the width direction of the pixel electrode (102), the second recess (102*e*) extending from the other side along the width direction of the pixel electrode (102) toward the bridging portion (102*c*) and being located between the first pixel electrode portion (102*a*) and the second pixel electrode portion (102*b*).

1 Claim, 13 Drawing Sheets

LIQUID CRYSTAL DISPLAY PANEL

TECHNICAL FIELD

This invention relates to a liquid crystal display panel whose display mode is a VA mode.

BACKGROUND ART

A liquid crystal display apparatus is a display apparatus which performs display by utilizing a liquid crystal composition. Under one representative displaying method, a liquid crystal composition is sealed in between a pair of substrates; a liquid crystal display panel including this pair of substrates and the liquid crystal composition, these being sandwiched between a pair of polarizers, is irradiated with light from a backlight; and a voltage is applied to the liquid crystal composition in order to change the alignment of the liquid crystal molecules, whereby the amount of light passing through the liquid crystal display panel is controlled. Such a liquid crystal display apparatus has advantages such as a thin profile, light weight, and low power consumption, and therefore is utilized in smartphones, tablet PCs, car navigation systems, and other electronic devices.

In some conventional liquid crystal display panels, one pixel is divided into a plurality of domains (alignment regions), such that liquid crystal molecules are aligned in a different azimuth in each domain, thereby improving viewing angle characteristics. Examples of the method of achieving such alignment division in a pixel are methods that divide a half pixel into four domains of two rows by two columns; currently, a 4D-RTN (4Domain-Reverse Twisted Nematic) mode of Patent Documents 1 and 2, and a 4D-ECB (4Domain-Electrically Controlled Birefringence) mode of Patent Document 2, and the like are under study.

At a boundary between regions of different alignment azimuths of liquid crystal molecules, owing to continuity of the liquid crystal molecules, there are always portions where the alignment direction of liquid crystal molecules is parallel to the polarization axis of one of the polarizers. When liquid crystal displaying is performed in such a state, the aforementioned portions are visible as dark lines because no light is transmitted therethrough, and thus the transmittance and contrast ratio are reduced.

FIG. 14 is a schematic plan view showing one pixel, illustrating an exemplary region in which a dark line 1120 may occur in the liquid crystal display panel of Patent Document 3.

In the aforementioned liquid crystal display panel of Patent Document 3, one pixel is divided into four domains of one column by four rows. More specifically, a pixel 1000 includes four domains 1000a, 1000b, 1000c and 1000d in which liquid crystal molecules 1041 have mutually different alignment azimuths (azimuths of tilt). The domains 1000a, 1000b, 1000c and 1000d are arranged along the longitudinal direction of the pixel 1000 (i.e., the up-down direction in FIG. 14). Herein, when an azimuth flush with the transverse direction of the pixel 1000 (i.e., the right-left direction in FIG. 14) is defined as 0°, an alignment azimuth of the liquid crystal molecules 1041 in the domain 1000a is 45°; an alignment azimuth of the liquid crystal molecules 1041 in the domain 1000b is 225°; an alignment azimuth of the liquid crystal molecules 1041 in the domain 1000c is 135°; and an alignment azimuth of the liquid crystal molecules 1041 in the domain 1000d is 315°.

Since the alignment azimuth of the liquid crystal molecules 1041 in the domain 1000a is different from the alignment azimuth of the liquid crystal molecules 1041 in the domain 1000b, a portion 1120b of the dark line 1120 extends along the boundary between the domain 1000a and the domain 1000b.

Moreover, since the alignment azimuth of the liquid crystal molecules 1041 in the domain 1000c is different from the alignment azimuth of the liquid crystal molecules 1041 in the domain 1000d, another portion 1120a of the dark line 1120 extends along the boundary between the domain 1000c and the domain 1000d.

What is depicted at 1011 in FIG. 14 is a wiring line.

CITATION LIST

Patent Literature

[Patent Document 1] Japanese Patent No. 5184618
[Patent Document 2] Japanese Laid-Open Patent Publication No. 2011-85738
[Patent Document 3] International Publication No. 2017/047532

SUMMARY OF INVENTION

Technical Problem

The inventors have studied alignment azimuths of the liquid crystal molecules 41 in the four domains 1000a, 1000b, 1000c and 1000d to find that, from the standpoint of enhancing the transmittance of pixels, it is preferable to set the alignment azimuths of the liquid crystal molecule 1041 in the domains 1000a, 1000b, 1000c and 1000d to 135°, 225°, 45° and 315°, or to 45°, 315°, 135° and 225°.

However, setting the alignment azimuths of the liquid crystal molecule 1041 in the domains 1000a, 1000b, 1000c and 1000d to 135°, 225°, 45° and 315°, or to 45°, 315°, 135° and 225°, results in the problem of an increased geometric area being occupied by a dark line(s) occurring near the boundary between the domain 1000b and the domain 1000c, such that an adequate transmittance cannot be attained.

Therefore, a problem to be solved by this invention is to provide a liquid crystal display panel that can attain an adequate transmittance with a simple configuration.

Solution to Problem

A liquid crystal display panel according to one implementation of this invention is a liquid crystal display panel having a display mode that is a VA mode, comprising:
a plurality of rectangular-shaped pixels;
a first substrate section including a first substrate and pixel electrodes;
a liquid crystal layer provided on the first substrate section, the liquid crystal layer containing liquid crystal molecules; and
a second substrate section provided on the liquid crystal layer, the second substrate section including a second substrate and a counter electrode, wherein,
the plurality of pixels each include a first domain, a second domain, a third domain, and a fourth domain arranged along a longitudinal direction of the pixel,
when a direction orthogonal to the longitudinal direction of the pixel is defined as a transverse direction of the pixel and an azimuth flush with the transverse direction of the pixel is defined as 0°, an alignment azimuth of the liquid crystal molecules in the second domain is substantially 225° and an alignment azimuth of the liquid crystal molecules in the third domain is substantially 45°; or an alignment azimuth of the liquid crystal molecules in the second domain is substantially 315° and an alignment azimuth of the liquid crystal molecules in the third domain is substantially 135°, each pixel electrode includes a first pixel electrode portion facing the first and second domains in a thickness direction of the pixel electrode, a second pixel electrode portion facing the third and fourth domains in the thickness direction of the pixel electrode, and a bridging portion being provided between the first pixel electrode portion and the second pixel electrode portion and linking together the first pixel electrode portion and the second pixel electrode portion;

a first recess is provided at one side along a width direction of the pixel electrode, the first recess extending from the one side along the width direction of the pixel electrode toward the bridging portion and being located between the first pixel electrode portion and the second pixel electrode portion; and a second recess is provided at another side along the width direction of the pixel electrode, the second recess extending from the other side along the width direction of the pixel electrode toward the bridging portion and being located between the first pixel electrode portion and the second pixel electrode portion.

Herein, the aforementioned alignment azimuth of a liquid crystal molecule refers to, in a plan view of the liquid crystal molecule under an applied voltage across the liquid crystal layer, a direction from one end of the liquid crystal molecule along its major axis direction that is at the first substrate section side to the other end of the liquid crystal molecule along its major axis direction that is at the second substrate section side. In this case, when the alignment azimuth of a liquid crystal molecule is said to be 0°, this alignment azimuth corresponds to the rightward direction from one end of the liquid crystal molecule along its major axis direction that is at the first substrate section side (so-called the 3 o'clock direction). In that case, when the alignment azimuth of a liquid crystal molecule is said to be 45°, this alignment azimuth corresponds to an alignment azimuth that results through a 45° counterclockwise rotation from the 0° alignment azimuth of the liquid crystal molecule.

As referred to above, substantially 45° means an angle in the range from 30° to 60°, or an angle in the range from 40° to 50°. As referred to above, substantially 135° means an angle in the range from 150° to 120°, or an angle in the range from 140° to 130°. As referred to above, substantially 225° means an angle in the range from 210° to 240°, or an angle in the range from 220° to 230°. As referred to above, substantially 315° means an angle in the range from 300° to 330°, or an angle in the range from 310° to 320°.

Advantageous Effects of Invention

Owing to the aforementioned bridging portion and first and second recesses, a liquid crystal display panel according to this invention can attain an adequate transmittance with a simple configuration.

DESCRIPTION OF EMBODIMENTS

Figure 1:
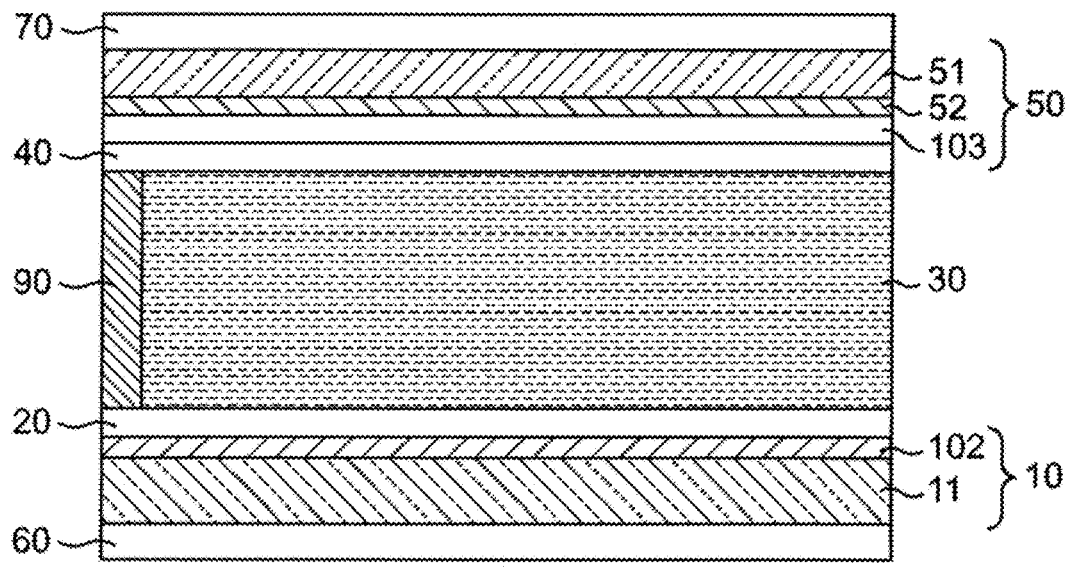
FIG. 1 A schematic cross-sectional view of a liquid crystal display panel according to a first embodiment of the present invention.

Hereinafter, by way of embodiments illustrated in the drawings, liquid crystal display panels according to this invention will be described in more detail. In the drawings, common portions are denoted by like numerals, with any redundant description being omitted.

First Embodiment

FIG. 1 is a cross-sectional view schematically showing a cross section of a liquid crystal display panel according to a first embodiment of this invention.

The liquid crystal display panel is a liquid crystal display panel whose display mode is a VA mode, including: a first substrate section 10; a first vertical alignment film 20; a liquid crystal layer 30 containing liquid crystal molecules 41 (shown in FIG. 2 and FIG. 3); a second vertical alignment film 40; and a second substrate section 50. The first vertical alignment film 20, the liquid crystal layer 30, the second vertical alignment film 40, and the second substrate section 50 are stacked in this order on the first substrate section 10. Between the first vertical alignment film 20 and the second vertical alignment film 40, a sealing member 90 with which to seal the liquid crystal layer 30 is provided. Herein, light from the first substrate section 10 side passes through the liquid crystal layer 30, and thereafter travels toward the second substrate section 50 side. In other words, the aforementioned light enters into the liquid crystal display panel and then goes out from the liquid crystal display panel at the second substrate section 50 side.

The first substrate section 10 includes a first glass substrate 11 and pixel electrodes 102 provided on an upper surface of the first glass substrate 11. Also, thin film transistors 13 (shown in FIG. 3 and FIG. 4) are provided on the upper surface of the first glass substrate 11, the thin film transistors 13 being electrically connected to the pixel electrodes 102. Under the first substrate section 10, a first polarizer 60 is disposed. Note that the first glass substrate 11 is an example of a first substrate.

The second substrate section 50 includes a second glass substrate 51, a color filter 52, and a counter electrode 103. Along the thickness direction of the second glass substrate 51, the color filter 52 is opposed to the pixel electrodes 102. On the second substrate section 50, a second polarizer 70 having a polarization axis that is orthogonal to a polarization axis (transmission axis) of the first polarizer 60 is disposed. Note that the second glass substrate 51 is an example of a second substrate.

The pixel electrodes 102 and the counter electrode 103 may each be a transparent electrode of ITO (Indium Tin Oxide), for example.

Figure 2:
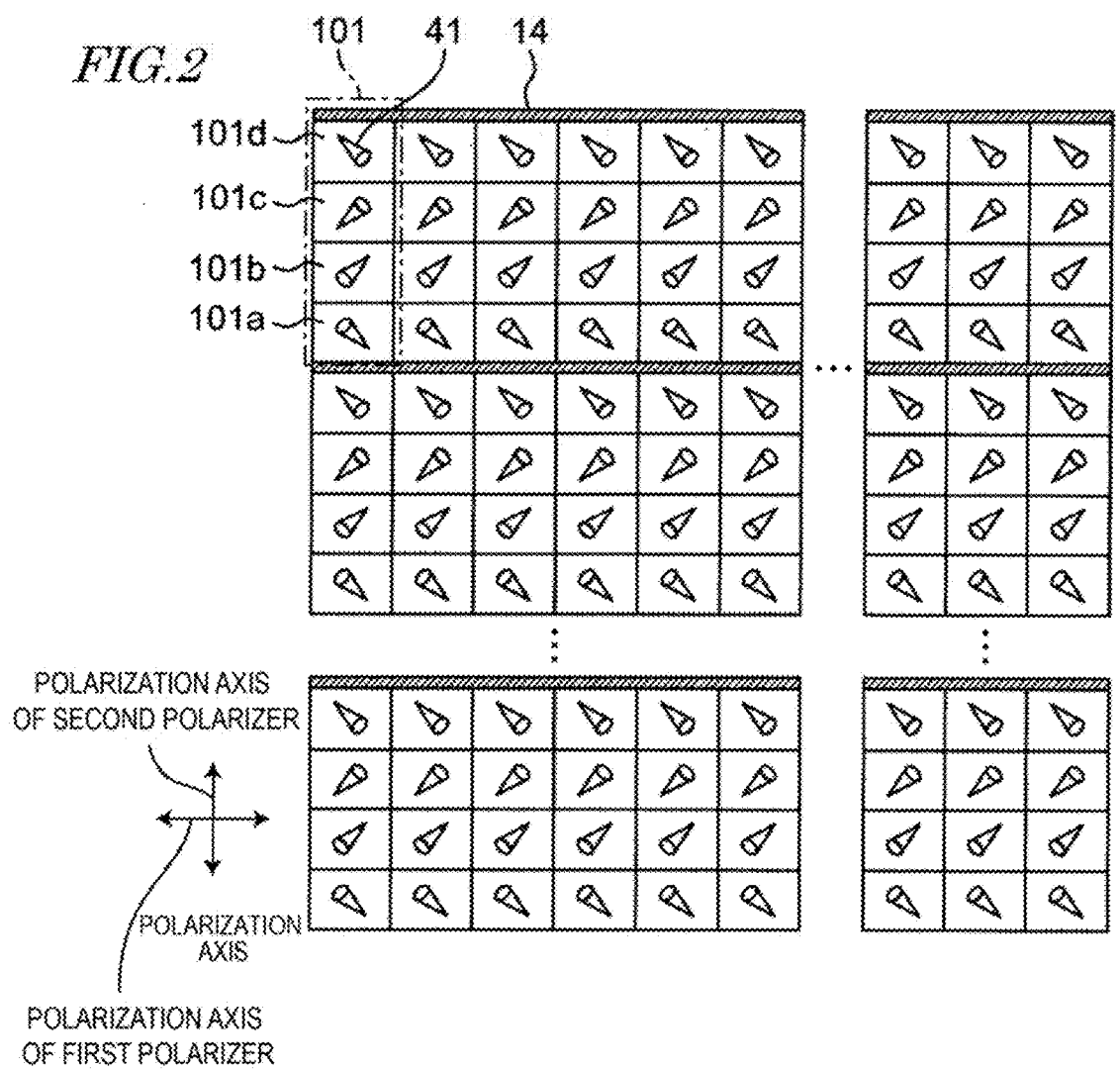
FIG. 2 A schematic plan view of the liquid crystal display panel according to the first embodiment.

FIG. 2 is a plan view schematically showing the liquid crystal display panel. In FIG. 2, liquid crystal molecules 41 under an applied voltage across the liquid crystal layer 30 are depicted by cone shapes. More specifically, one end of each liquid crystal molecule 41 along its major axis direction that corresponds to the apex of the cone is located at the first substrate section 10 side. On the other hand, the other end of each liquid crystal molecule 41 along the major axis direction that corresponds to the bottom of the cone is located at the second substrate section 50 side.

In the liquid crystal display panel, a plurality of rectangular-shaped pixels 101 are arranged in a matrix. Each pixel 101 includes four domains 100a, 100b, 100c and 100d, which differ from one another in terms of the alignment azimuth of the liquid crystal molecules 41. Moreover, the domains 100a, 100b, 100c and 100d are arranged along the longitudinal direction of the pixel 101 (i.e., the up-down direction in FIG. 2). Note that the domain 101a is an example of a first domain; the domain 101b is an example of a second domain; the domain 101c is an example of a third domain; and the domain 101d is an example of a fourth domain.

When the liquid crystal display panel is viewed from the second substrate section 50 side, assuming that a direction that is orthogonal to the longitudinal direction of each pixel 101 is defined as the transverse direction of the pixel 101 (i.e., the right-left direction in FIG. 2) and that an azimuth along this transverse direction is defined as 0°, then an alignment azimuth of the liquid crystal molecules 41 in the domain 101a is substantially 135°; an alignment azimuth of the liquid crystal molecules 41 in the domain 101b is substantially 225°; an alignment azimuth of the liquid crystal molecules 41 in the domain 101c is substantially 45°; and an alignment azimuth of the liquid crystal molecules 41 in the second domain is substantially 315°. These alignment azimuths may be conferred by irradiating a photoalignment film with polarized UV light through a mask, for example.

Moreover, in order to enhance the transmittance of the liquid crystal layer 30, the transverse direction of the pixel 101 is set so as to be parallel to the polarization axis of the first polarizer 60.

Herein, the alignment azimuth of a liquid crystal molecule 41 is an orientation that does not take into account any tilt angle (pretilt angle) with respect to the normal direction of the upper surface of the first glass substrate 11. More specifically, the alignment azimuth of a liquid crystal molecule 41 means a direction in which the other end (i.e., the end at the second substrate section 50 side) of the liquid crystal molecule 41 along its major axis direction is oriented, when the liquid crystal molecule 41 is projected onto the upper surface of the first glass substrate 11, i.e., when the liquid crystal molecule 41 is viewed from the second substrate section 50 side. For example, the liquid crystal molecule 41 are arranged in such a manner that: if the crystal orientation of a liquid crystal molecule 41 is 10°, when that liquid crystal molecule 41 is viewed from the second substrate section 50 side, the other end of the liquid crystal molecule 41 along its major axis direction constitutes 10° with respect to a direction parallel to the transverse direction of the pixel 101. Note that any angle in a counterclockwise direction with respect to the direction parallel to the transverse direction of the pixel 101 is assumed to have a positive value.

As referred to above, substantially 45° means an angle in the range from 30° to 60°, or an angle in the range from 40° to 50°. As referred to above, substantially 135° means an angle in the range from 150° to 120°, or an angle in the range from 140° to 130°. As referred to above, substantially 225° means an angle in the range from 210° to 240°, or an angle in the range from 220° to 230°. As referred to above, substantially 315° means an angle in the range from 300° to 330°, or an angle in the range from 310° to 320°.

In FIG. 2, a gate line extending along the transverse direction of the pixels 101 is depicted at 14.

Figure 3:
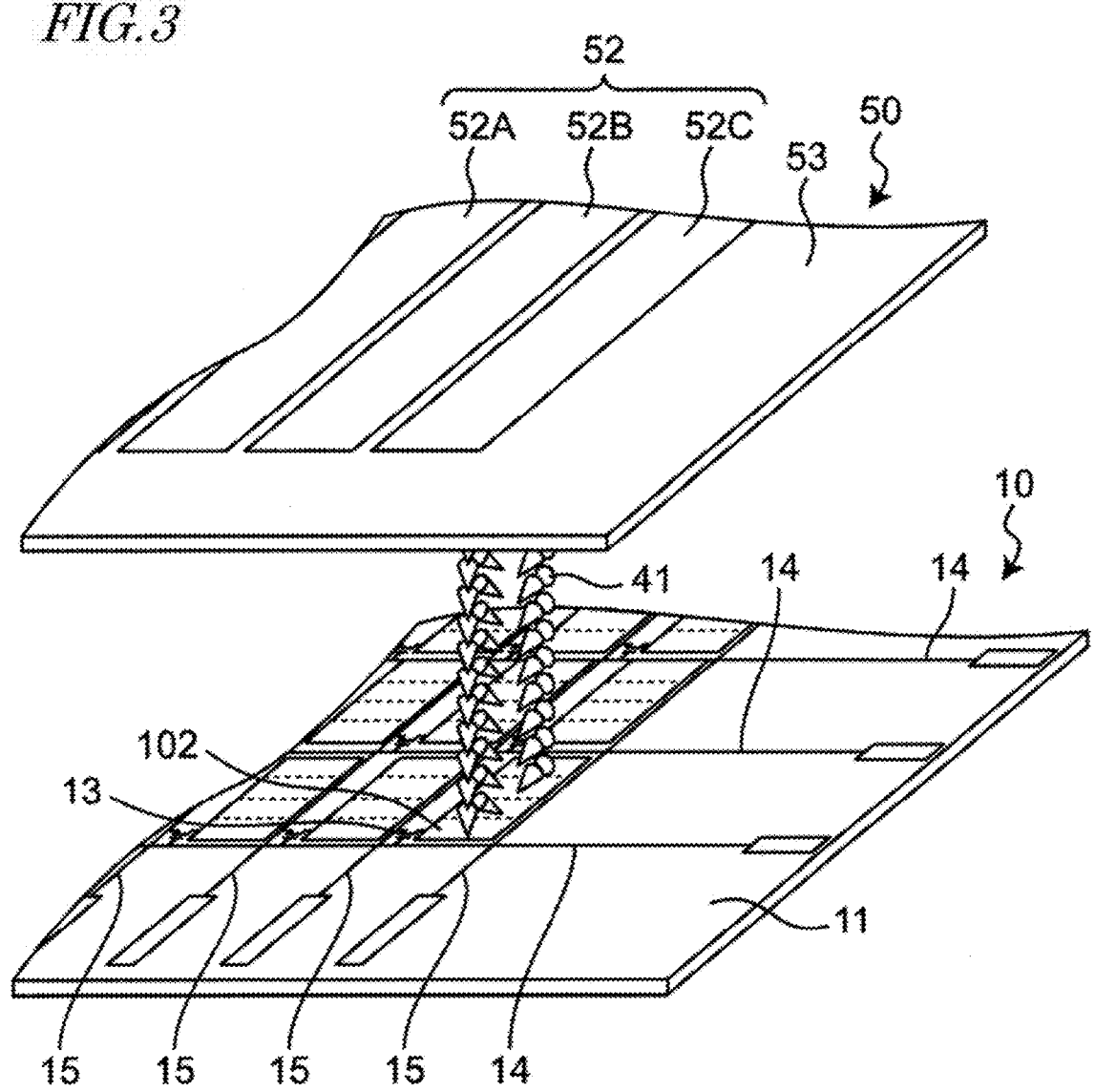
FIG. 3 A schematic perspective view for describing the attitudes of liquid crystal molecules according to the first embodiment.

FIG. 3 is a schematic perspective view for describing the attitudes of the liquid crystal molecules 41 under an applied voltage across the liquid crystal layer 30.

In the domain 101a, the liquid crystal molecules 41 have an essentially constant pretilt angle between the pixel electrode 102 and the counter electrode 103. Similarly, in each of the domains 101b, 101c and 101d, the liquid crystal molecules 41 have an essentially constant pretilt angle between the pixel electrode 102 and the counter electrode 103.

A plurality of pixel electrodes 102 are disposed in a matrix, so as to be in rectangular-shaped regions. Each such region is a region that is delineated by a plurality of gate lines 14, 14, ... , which are parallel to one another and a plurality of source lines 15, 15, ... , which are parallel to one another.

The gate lines 14, 14, ... are provided on the first glass substrate 11, and extend along a direction which is parallel to the transverse direction of the pixels 101. Moreover, each gate line 14 is electrically connected to gates of thin film transistors 13.

The source lines 15 are provided on the first glass substrate 11, and extend along a direction which is parallel to the longitudinal direction of the pixels 101. Moreover, each source line 15 is electrically connected to sources of thin film transistors 13.

As the thin film transistors 13, those having channels made by using silicon or an oxide semiconductor are suitably used, for example. As such an oxide semiconductor, for example, a compound composed of indium, gallium, zinc, and oxygen (In—Ga—Zn—O), a compound composed of indium, tin, zinc, and oxygen (In—Tin-Zn—O), or a compound composed of indium, aluminum, zinc, and oxygen (In—Al—Zn—O) can be used.

As the gate lines 14 and the source lines 15, those which are commonly used in the field of liquid crystal display panels can be used, e.g., a metal such as copper, titanium, chromium, aluminum, or molybdenum, or an alloy thereof, etc.

The color filter 52 is composed of red color filters 52A, green color filters 52B, and blue color filters 52C. The red color filters 52A, the green color filters 52B, and the blue color filters 52C are each located above a plurality of pixel electrodes 102 that are arranged along the longitudinal direction of the pixels 101, and extend along the longitudinal direction of the pixels 101.

Figure 4:
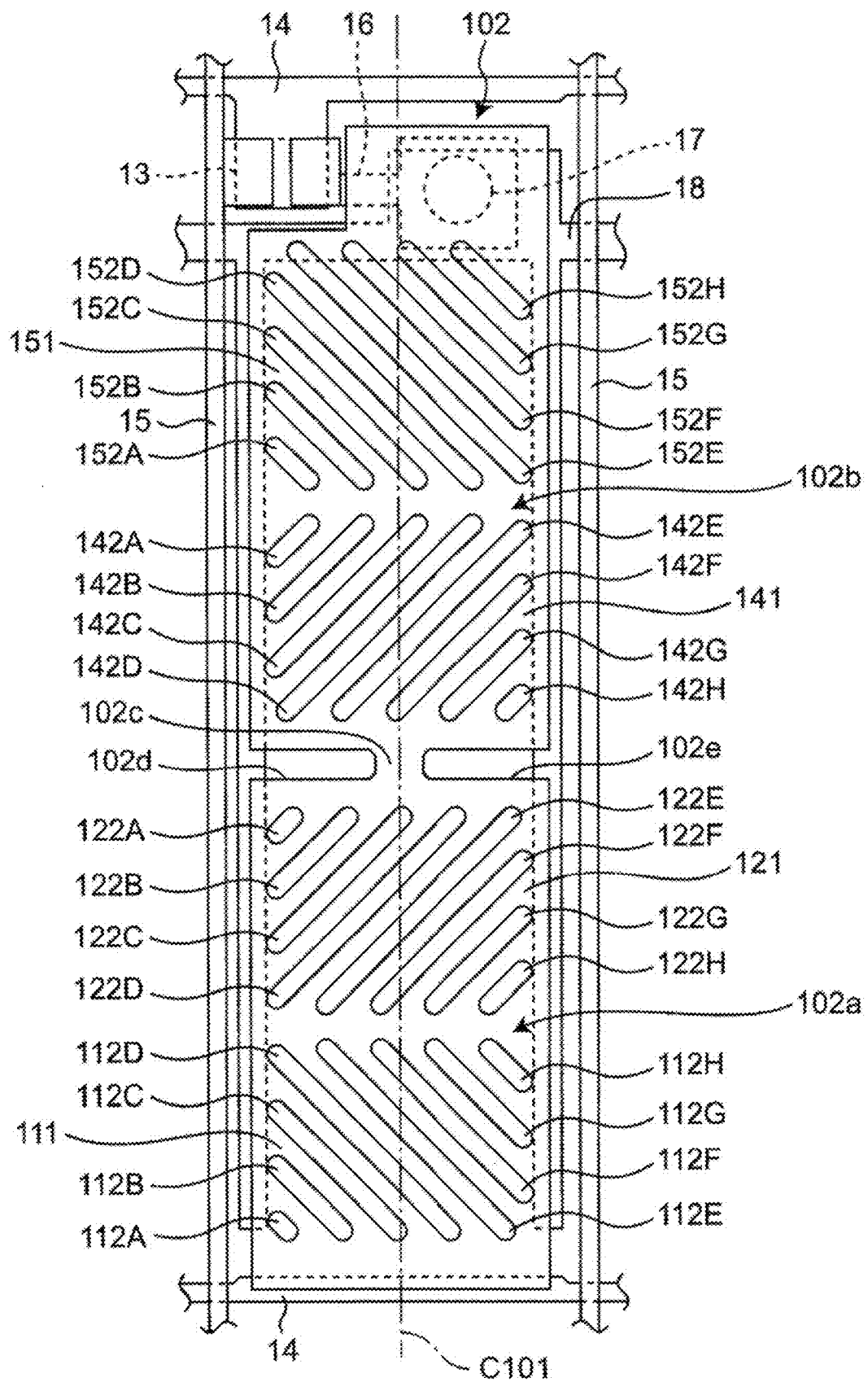
FIG. 4 An enlarged plan view of a pixel electrode according to the first embodiment and its neighborhood.

FIG. 4 is an enlarged plan view of a pixel electrode 102 and its neighborhood.

A drain of the thin film transistor 13 is electrically connected to a drain line 16. The drain line 16 is electrically connected also to the pixel electrode 102, via an electrical conductor in a contact hole 17.

Within each rectangular-shaped region that is delineated by the gate lines 14, 14, . . . and the source lines 15, 15, . . . , a capacitor line 18 is also formed. The capacitor line 18 is formed so as to extend along three sides of the pixel electrode 102, and is electrically connected to the pixel electrode 102.

The pixel electrode 102 includes: a first pixel electrode portion 102a opposed to the domains 101a and 101b along the thickness direction of the pixel electrode 102 (i.e., a direction perpendicular to the plane of the figure of FIG. 4); and a second pixel electrode portion 102b opposed to the domains 101c and 101d along the thickness direction of the pixel electrode 102. Between the first pixel electrode portion 102a and the second pixel electrode portion 102b, a bridging portion 102c is provided.

The first pixel electrode portion 102a includes: a first slitted region 111 opposed to the domain 101a along the thickness direction of the pixel electrode 102; and a second slitted region 121 opposed to the domain 101b along the thickness direction of the pixel electrode 102.

In the first slitted region 111, eight slits 112A, 112B, . . . , 112H extending along a direction parallel to the alignment azimuth of the liquid crystal molecules 41 in the domain 101a are formed.

The slits 112A, 112B, . . . , 112H are mutually equal in width, while being set to mutually different lengths. The width of the slits 112A, 112B, . . . , 112H is set to e.g. 3.0 μm. The interval between the slits 112A, 112B, . . . , 112H is also set to e.g. 3.0 μm. In other words, the design pitch of the slits 112A, 112B, . . . , 112H may be set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 121, eight slits 122A, 122B, . . . , 122H extending along a direction parallel to the alignment azimuth of the liquid crystal molecules in the domain 101b are formed.

The slits 122A, 122B, . . . , 122H also are mutually equal in width, while being set to mutually different lengths. The width of the slits 122A, 122B, . . . , 122H is set to the same width as the width of the slits 112A, 112B, . . . , 112H. Moreover, the interval between the slits 122A, 122B, . . . , 122H is also set to the same interval as the interval between the slits 112A, 112B, . . . , 112H. Note that, in terms of improving transmittance of the pixel 101, the design pitch of the slits 122A, 122B, . . . , 122H also is e.g. 7.0 μm or less, and in terms of facilitating fabrication the design pitch is preferably e.g. 5.2 μm or more.

Moreover, no slits are formed in the region between the slits 112A, 112B, . . . , 112H and the slits 122A, 122B, . . . , 122H.

The second pixel electrode portion 102b includes: a first slitted region 141 opposed to the domain 101c along the thickness direction of the pixel electrode 102; and a second slitted region 151 opposed to the domain 101d along the thickness direction of the pixel electrode 102.

In the first slitted region 141, eight slits 142A, 142B, . . . , 142H extending along a direction parallel to the alignment azimuth of the liquid crystal molecules 41 in the domain 101c are formed.

The slits 142A, 142B, . . . , 142H are mutually equal in width, while being set to mutually different lengths. The width of the slits 142A, 142B, . . . , 142H is set to e.g. 3.0 μm. Moreover, the interval between the slits 142A, 142B, . . . , 142H is also set to e.g. 3.0 μm. In other words, the design pitch of the slits 142A, 142B, . . . , 142H is set to e.g. 6.0 μm. Note that, in terms of improving transmittance of the pixel 101 the design pitch is preferably e.g. 7.0 μm or less, and in terms of facilitating fabrication the design pitch is preferably e.g. 5.2 μm or more.

In the second slitted region 151, eight slits 152A, 152B, . . . , 152H extending along a direction parallel to the azimuth of the liquid crystal molecules in the domain 101b are formed.

The slits 152A, 152B, . . . , 152H also are mutually equal in width, while being set to mutually different lengths. The width of the slits 152A, 152B, . . . , 152H is set to the same width as the width of the slits 142A, 142B, . . . , 142H. Moreover, the interval between the slits 152A, 152B, . . . , 152H is set to the same interval as the interval between the slits 142A, 142B, . . . , 142H. Note that, in terms of improving transmittance of the pixel 101, the design pitch of the slits 152A, 152B, . . . , 152H also is e.g. 7.0 μm or less, and in terms of facilitating fabrication the design pitch is preferably e.g. 5.2 μm or more.

Moreover, no slits are formed in the region between the slits 142A, 142B, . . . , 142H and the slits 152A, 152B, . . . , 152H.

The bridging portion 102c is a portion that connects between the first pixel electrode portion 102a and the second pixel electrode portion 102b. When a center line C101 which extends along the longitudinal direction of the pixel 101 and which passes through a center of the width direction of the pixel electrode 102 is defined, the bridging portion 102c overlaps the center line C101.

Moreover, a first recess 102d is provided at one side along the width direction of the pixel electrode 102. Between the first pixel electrode portion 102a and the second pixel electrode portion 102b, the first recess 102d extends from one side along the width direction of the pixel electrode 102 toward the bridging portion 102c.

Moreover, a second recess 102e is provided at the other side along the width direction pixel electrode 102. Between the first pixel electrode portion 102a and the second pixel electrode portion 102b, the second recess 102e extends from the other side along the width direction of the pixel electrode 102 toward the bridging portion 102c.

Moreover, the first recess 102d, the bridging portion 102c, and the second recess 102e are arranged along the width direction of the pixel electrode 102. The width of the first recess 102d is set equal to the width of the second recess 102e. For example, the width of the first and second recesses 102d and 102e is set so as to fall within the range of e.g. 4.0 to 5.0 μm. To explain more specifically, one side of the first recess 102d that is closer to the second pixel electrode portion 102b is aligned in position with one side of the second recess 102e that is closer to the second pixel electrode portion 102b, along the width direction of the pixel electrode 102. In other words, one side of the first recess 102d that is closer to the second pixel electrode portion 102b is collinear with one side of the second recess 102e that is closer to the second pixel electrode portion 102b. Similarly, one side of the first recess 102d that is closer to the first pixel electrode portion 102a is collinear with one side of the second recess 102e that is closer to the first pixel electrode portion 102a.

Moreover, no slits are formed in the region between the first and second recesses 102d and 102e and the slits 122A, 122B, . . . , 122E. In other words, the first and second recesses 102d and 102e are formed in the pixel electrode 102 so as to have a predetermined interval with the slits 122A, 122B, . . . , 122H.

Moreover, no slits are formed in the region between the first and second recesses 102d and 102e and the slits 142D, 142E, . . . , 142H. In other words, the first and second recesses 102d and 102e are formed in the pixel electrode 102 so as to have a predetermined interval with the slits 142A, 142B, . . . , 142H.

With the liquid crystal display panel of the above configuration, when a voltage is applied to the liquid crystal layer 30, a double dark line occurs in a portion between the first pixel electrode portion 102a and the second pixel electrode portion 102b. Since the bridging portion 102c and the first and second recesses 102d and 102e are provided between the first pixel electrode portion 102a and the second pixel electrode portion 102b, the geometric area of the double dark line can be reduced. As a result, the pixel 101 can attain an adequate transmittance with a simple configuration.

Moreover, since the bridging portion 102c is formed so as to overlap the center line C101, a disclination in the double dark line can be caused on the central portion of the width direction of the pixel electrode 102. Thus, variation in the sites of occurrence of a disclination in the double dark line can be suppressed.

Figure 5:
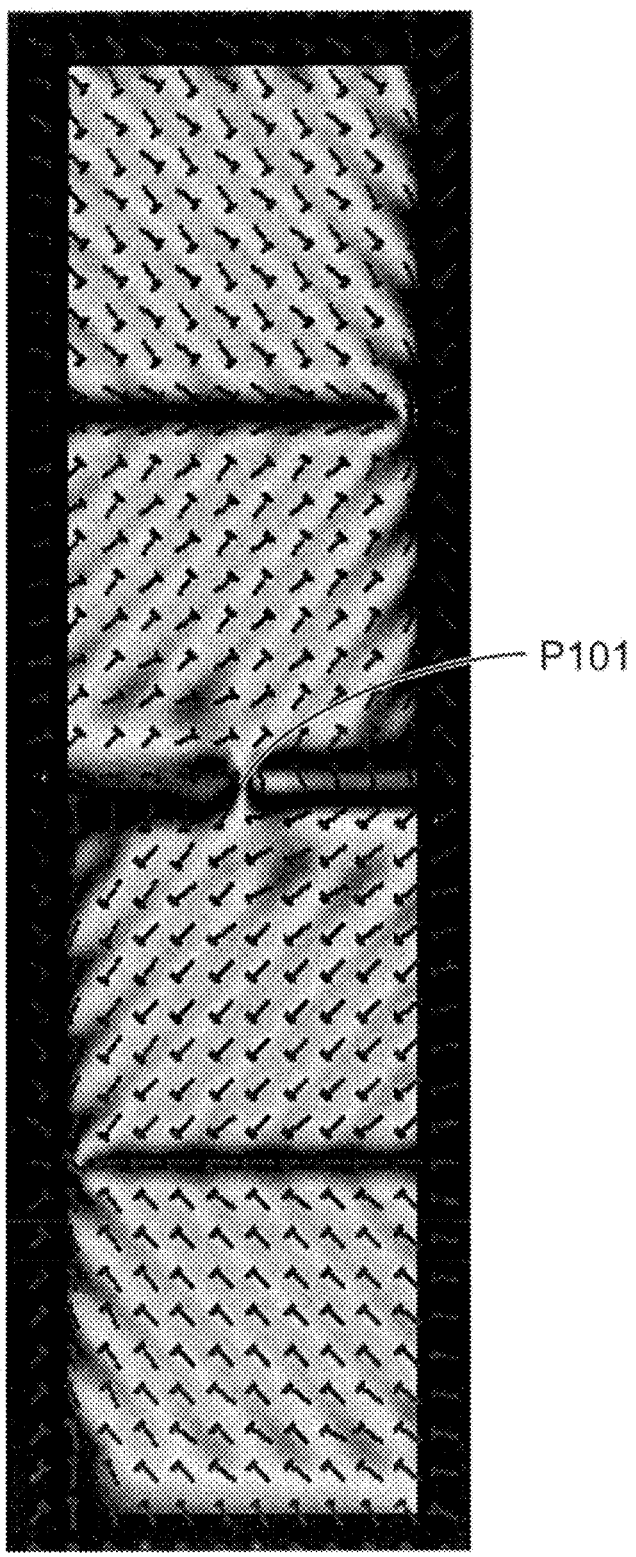
FIG. 5 A photographic representation of a simulation of dark lines in the first embodiment.

FIG. 5 is a photographic representation of one pixel, illustrating a result of simulating occurrence of dark lines in the first embodiment. In FIG. 5, liquid crystal molecules 41 under an applied voltage across the liquid crystal layer 30 are depicted as bolt shapes. More specifically, heads of the bolts correspond to bottoms of the cones in FIG. 2 and FIG. 3. On the other hand, ends of the bolts opposite to their heads, i.e., the tips, correspond to apices of the cones in FIG. 2 and FIG. 3.

It can be seen from FIG. 5 that although a double dark line extends along the transverse direction of the pixel 101, an increase in the geometric area of this double dark line is suppressed.

It can also be seen that a disclination P101 has occurred above the central portion of the width direction of the pixel electrode 102.

Figure 6:
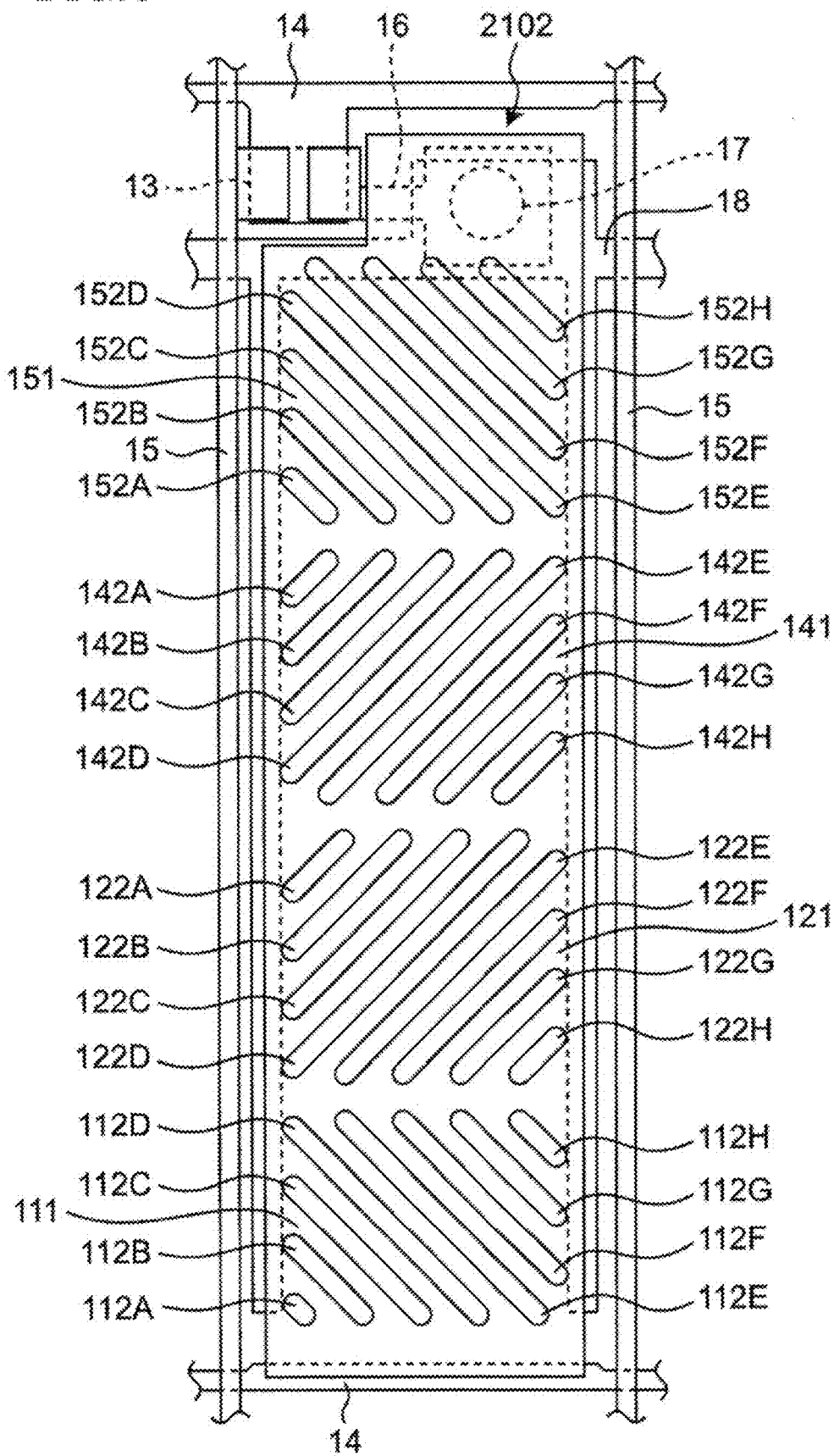
FIG. 6 An enlarged plan view of a pixel electrode according to Comparative Example for this invention and its neighborhood.

FIG. 6 is an enlarged plan view of a pixel electrode 2102 according to Comparative Example for this invention and its neighborhood.

The pixel electrode 2102 corresponds to the pixel electrode 102, from which the first and second recesses 102d and 102e are eliminated. In other words, the pixel electrode 2102 differs from the pixel electrode 102 only because of lacking the first and second recesses 102d and 102e.

Figure 7:
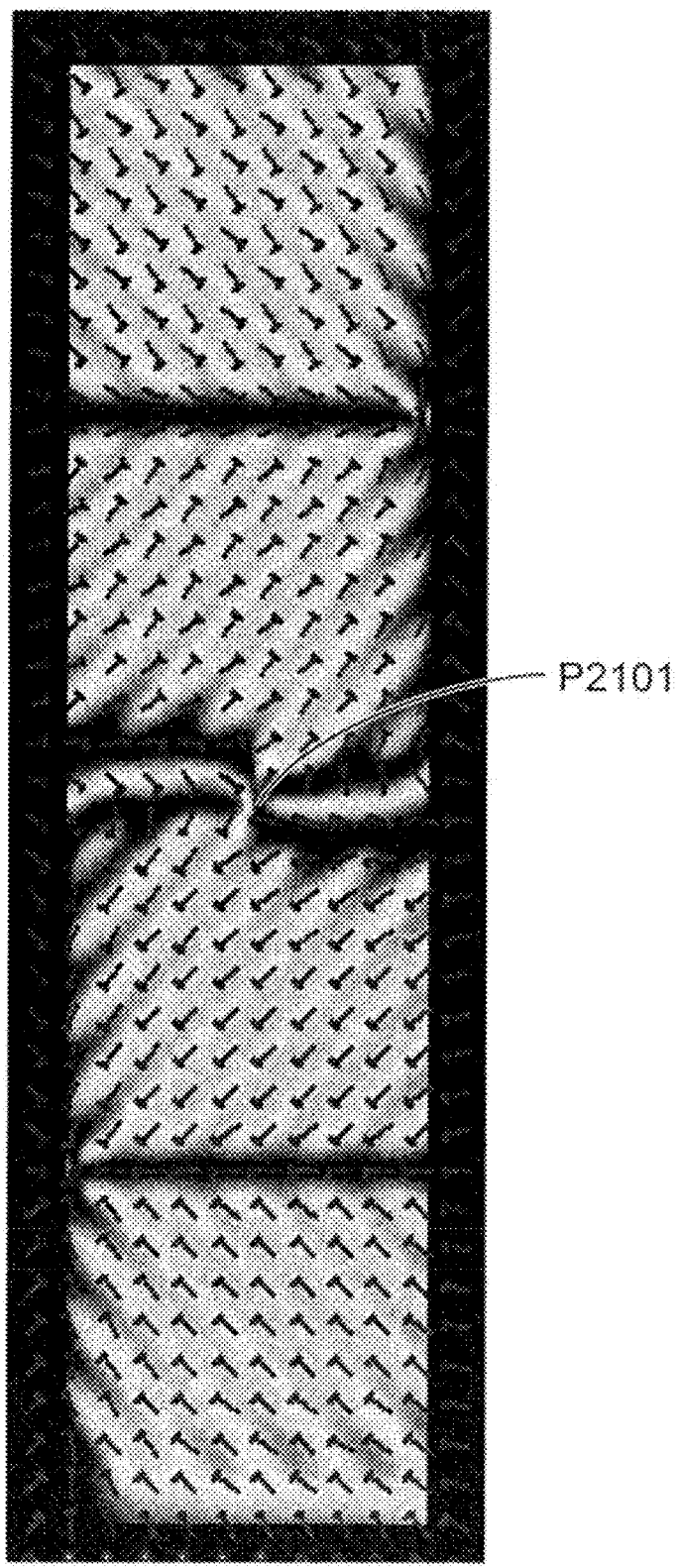
FIG. 7 A photographic representation of a simulation of dark lines in the aforementioned Comparative Example.

FIG. 7 is a photographic representation of one pixel in the case where the pixel electrode 2102 according to Comparative Example is used in the place of the pixel electrode 102 according to the first embodiment, illustrating a result of simulating occurrence of dark lines. In FIG. 7, similarly to FIG. 5, liquid crystal molecules 41 under an applied voltage across the liquid crystal layer 30 are depicted as bolt shapes.

It can be seen from FIG. 7 that a disclination P2101 occurs as in the first embodiment, but a double dark line that extends toward the disclination P2101 is thicker than that in the first embodiment.

Thus, it can be seen that the transmittance of the pixel 101 according to the first embodiment can be made higher than the transmittance of the pixel 101 according to Comparative Example.

The first embodiment illustrates that the alignment azimuths of the liquid crystal molecules 41 in the domains 101a, 101b, 101c and 101d are substantially 135°, 225°, 45° and 315°; however, they may be substantially 45°, 315°, 135° and 225°, for example.

The first embodiment illustrates that eight slits are formed in each of the first slitted regions 111 and 141 and in each of the second slitted regions 121 and 151; alternatively, any plurality, other than eight, of them may be formed. In other words, the number of slits is not limited to that in the first embodiment. Moreover, the width and length of the slits are not limited to those in the first embodiment.

The first embodiment illustrates that the width of the first recess 102d is set equal to the width of the second recess 102e; however, it may be set larger than the width of the second recess 102e, or smaller than the width of the second recess 102e.

In the first embodiment, the polarization axis of the first polarizer 60 is parallel to the transverse direction of the pixels 101, and the polarization axis of the second polarizer 70 is parallel to the longitudinal direction of the pixels 101. However, the polarization axis of the first polarizer 60 may be parallel to the longitudinal direction of the pixels 101, while the polarization axis of the second polarizer 70 may be parallel to the transverse direction of the pixels 101.

Figure 8:
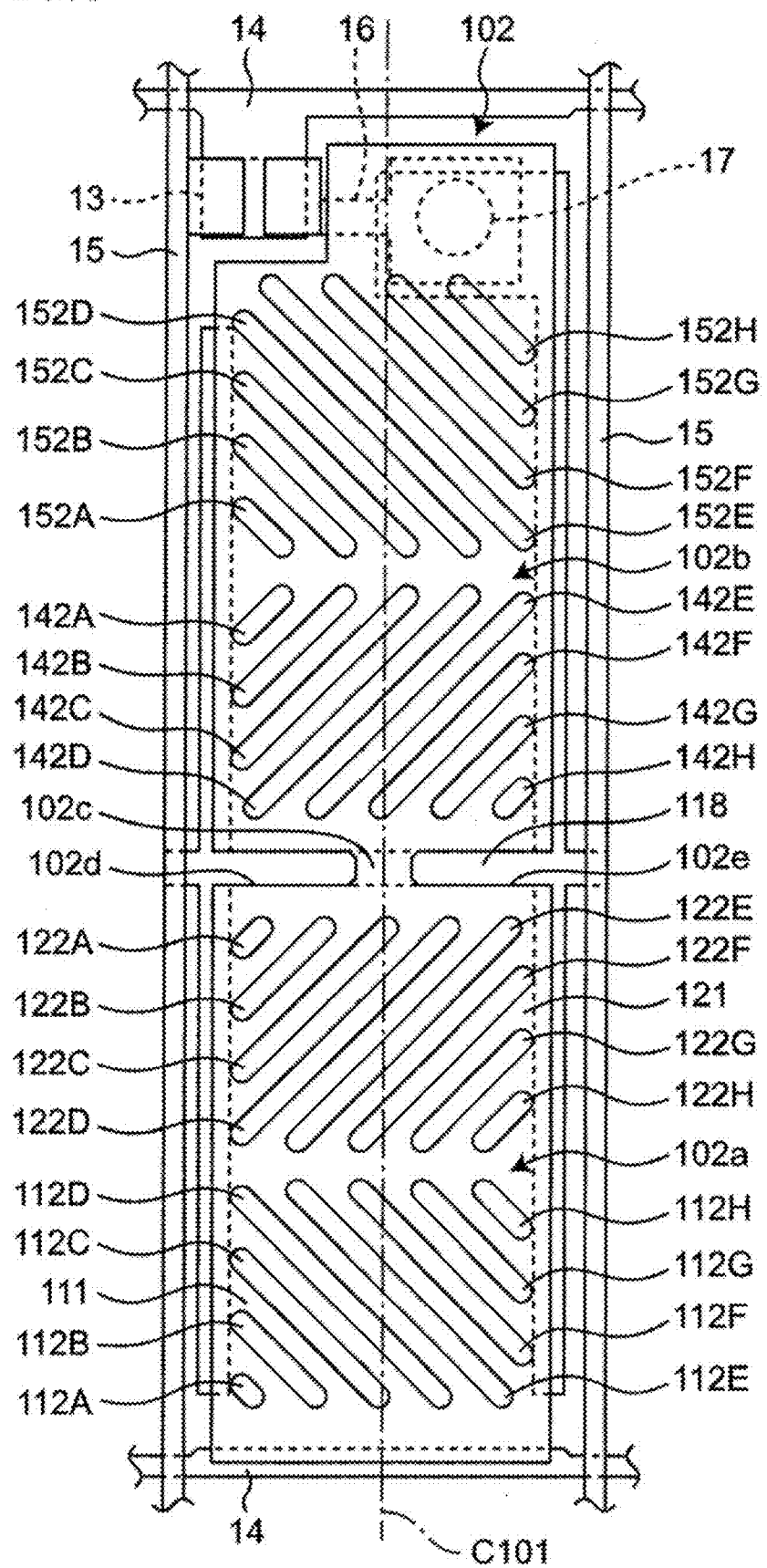
FIG. 8 An enlarged plan view of a pixel electrode according to a variation of the first embodiment and its neighborhood.
Figure 9:
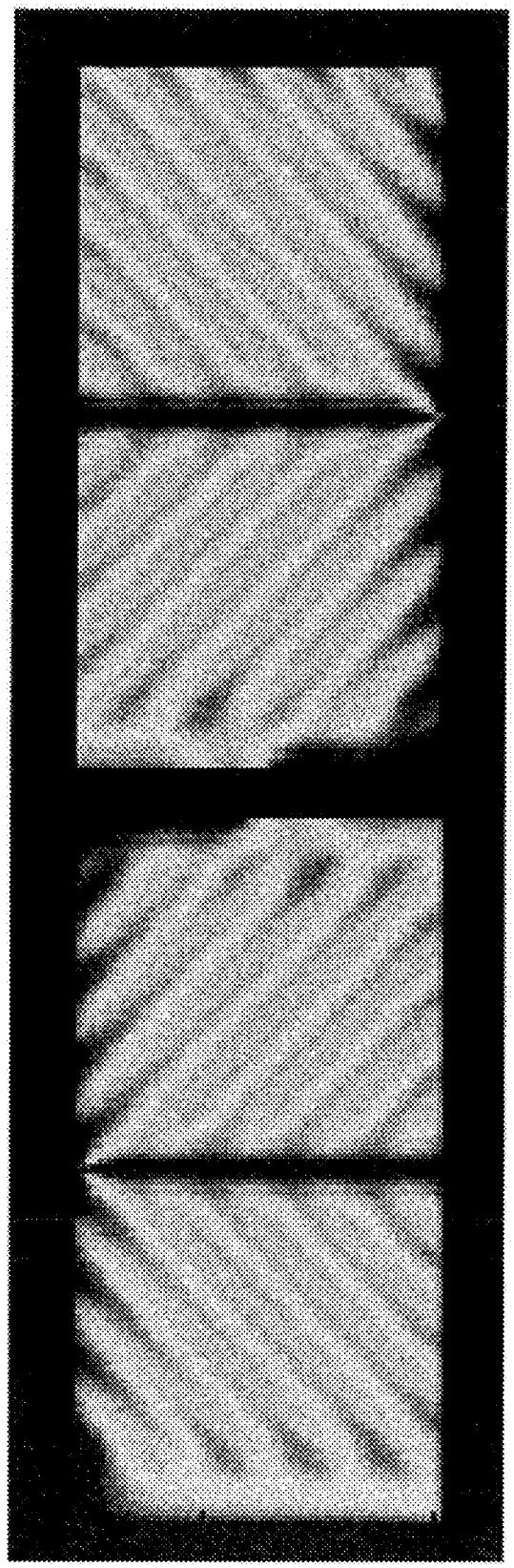
FIG. 9 A photographic representation of a simulation of dark lines in the aforementioned variation.

The first embodiment illustrates that the capacitor line 18 is formed so as to overlap the end of the pixel electrode 102 that is closer to the thin film transistor 13, as shown in FIG. 8; however, a capacitor line 118 may be formed so as to overlap the bridging portion 102c and the first and second recesses 102d and 102e of the pixel electrode 102. When this is adopted, as shown in FIG. 9, transmittance will decrease relative to the first embodiment, but the longer distance between the gate line 14 and the capacitor line 118 allows for an enhanced producibility.

Second Embodiment

Hereinafter, a liquid crystal display panel according to a second embodiment of this invention will be described, where any constituent elements that are identical to constituent element of the first embodiment will be denoted by identical reference numerals to those of the constituent elements in the first embodiment.

Figure 10:
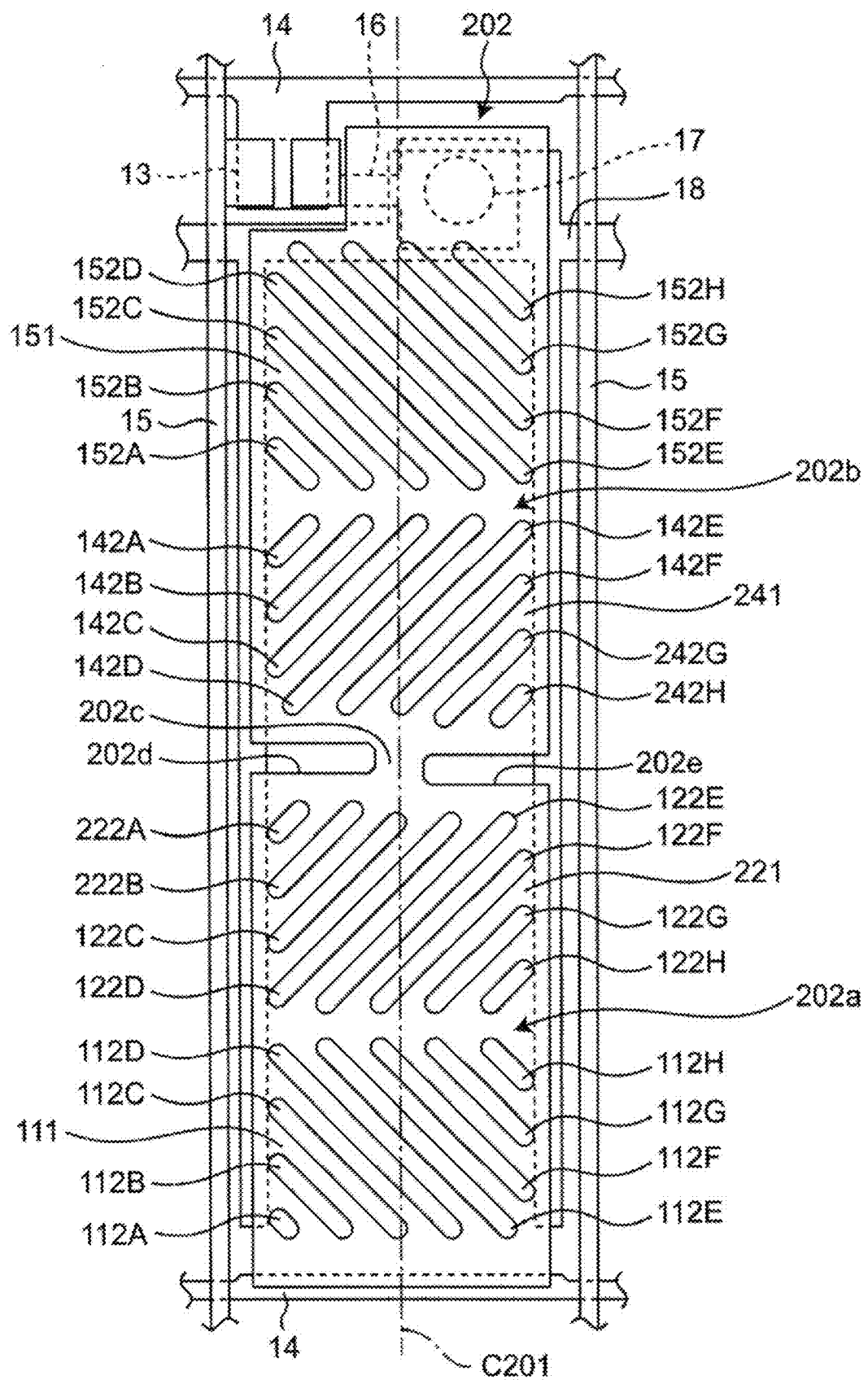
FIG. 10 An enlarged plan view of a pixel electrode according to a second embodiment of this invention and its neighborhood.

FIG. 10 is a plan view showing enlarged a pixel electrode 202 included in a liquid crystal display panel according to a second embodiment of this invention, and its neighborhood.

The liquid crystal display panel according to the second embodiment differs from the liquid crystal display panel according to the first embodiment in that it includes the pixel electrode 202 instead of the pixel electrode 102. In the liquid crystal display panel according to the second embodiment, any portion other than the pixel electrode 202 is configured similarly to its counterpart in the liquid crystal display panel according to the first embodiment.

The pixel electrode 202 includes: a first pixel electrode portion 202a opposed to the domains 101a and 101b along the thickness direction of the pixel electrode 202 (i.e., a direction perpendicular to the plane of the figure of FIG. 10); and a second pixel electrode portion 202b opposed to the domains 101c and 101d along the thickness direction of the pixel electrode 202. Between the first pixel electrode portion 202a and the second pixel electrode portion 202b, a bridging portion 202c is provided.

At its side closer to the second pixel electrode portion 202b, the first pixel electrode portion 202a includes a second slitted region 221, the second slitted region 221 facing the domain 101b in the thickness direction of the pixel electrode 202.

In the second slitted region 221, two slits 222A, 222B and six slits 122C, 122D, ..., 122H extending along a direction parallel to the alignment azimuth of the liquid crystal molecules in the domain 101b are formed. Note that the slits 222A to 222H are examples of second slits.

Along a direction parallel to the liquid crystal molecules in the domain 101b, the slits 222A, 222B are formed so as to be longer than the slits 122A, 122B. As a result of this, the ends of the slits 222A, 222B that are closer to the second pixel electrode portion 202b are located nearer the second pixel electrode portion 202b than are the ends of the six slits 122C, 122D, ..., 122H that are closer to the second pixel electrode portion 202b. Moreover, the width and the design pitch of the slits 222A, 222B are set similar to those of the slits 122A, 122B. In this case, the width and the design pitch of the slits 222A, 222B may be said to be similar to the width and the design pitch of the six slits 122C, 122D, ..., 122H.

Moreover, the ends of the slits 222A, 222B that are closer to the bridging portion 202c are aligned in position along the width direction of the pixel electrode 202. The ends of the slits 122C, 122D, 122E that are closer to the bridging portion 202c also are aligned in position along the width direction of the pixel electrode 202. Furthermore, the ends of the slits 222A, 222B that are closer to the bridging portion 202c are located nearer the bridging portion 202c than are the ends of the slits 122C, 122D, 122E that are closer to the bridging portion 202c. In other words, the ends of the slits 222A, 222B that are closer to the bridging portion 202c are disposed relatively near the bridging portion 202c, while the ends of the slits 122C, 122D, 122E that are closer to the bridging portion 202c are disposed relatively far from the bridging portion 202c. In other words, the ends of the slits 222A, 222B that are closer to the bridging portion 202c are provided so as to protrude toward the second pixel electrode portion 202b relative to the ends of the slits 122C, 122D, 122E that are closer to the bridging portion 202c. In the meantime, the distance between the ends of the slits 222A, 222B that are closer to the bridging portion 202c and the first recess 202d is equal or essentially equal to the distance between the ends of the slits 122C, 122D, 122E that are closer to the bridging portion 202c and the second recess 202e.

At its side closer to the first pixel electrode portion 202a, the second pixel electrode portion 202b includes a first slitted region 241, the first slitted region 241 facing the domain 101c in the thickness direction of the pixel electrode 202.

In the first slitted region 241, six slits 142A, 142B, ..., 142F, and two slits 242G, 242H extending along a direction parallel to the alignment azimuth of the liquid crystal molecules 41 in the domain 101c are formed.

Along a direction parallel to the alignment azimuth of the liquid crystal molecules 41 in the domain 101c, the slits 242G, 242H are formed so as to be longer than the slits 142G, 142H. As a result of this, the ends of the slits 242G, 242H that are closer to the first pixel electrode portion 202a are located nearer the first pixel electrode portion 202a than are the ends of the slits 142A, 142B, ..., 142F that are closer to the first pixel electrode portion 202a. Moreover, the width and the design pitch of the slits 242G, 242H are set similar to those of the slits 142G, 142H. In this case, the width and the design pitch of the slits 242G, 242H may be said to be similar to the width and the design pitch of the slits 142A, 142B, ..., 142F.

Moreover, the ends of the slits 142D, 142E, 142F that are closer to the bridging portion 202c are aligned in position along the width direction of the pixel electrode 202. The ends of the slits 242G, 242H that are closer to the bridging portion 202c also are aligned in position along the width direction of the pixel electrode 202. Furthermore, the ends of the slits 242G, 242H that are closer to the bridging portion 202c are located nearer the bridging portion 202c than are the ends of the slits 142D, 142E, 142F that are closer to the bridging portion 202c. In other words, the ends of the slits 142A, 142B, ..., 142F that are closer to the bridging portion 202c are disposed relatively far from the bridging portion 202c, while the ends of the slits 242G, 242H that are closer to the bridging portion 202c are disposed relatively near the bridging portion 202c. In other words, the ends of the slits 242G 242H that are closer to the bridging portion 202c are provided so as to protrude toward the first pixel electrode portion 202a relative to the ends of the slits 142D, 142E, 142F that are closer to the bridging portion 202c. In the meantime, the distance between the ends of the slits 142D, 142E, 142F that are closer to the bridging portion 202c and the first recess 202d is equal or essentially equal to the distance between the ends of the slits 242G, 242H that are closer to the bridging portion 202c and the second recess 202e.

Moreover, the distance between the ends of the slits 222A, 222B that are closer to the bridging portion 202c and the ends of the slits 142D, 142E that are closer to the bridging portion 202c is equal or essentially equal to the distance between the ends of the slits 122D, 122E that are closer to the bridging portion 202c and the ends of the slits 242G, 242H that are closer to the bridging portion 202c.

The bridging portion 202c is a portion that connects between the first pixel electrode portion 202a and the second pixel electrode portion 202b. When a center line C201 which extends along the longitudinal direction of the pixel 101 and which passes through a center of the width direction of the pixel electrode 202 is defined, the bridging portion 202c overlaps the center line C201.

Moreover, the first recess 202d is provided at one side along the width direction of the pixel electrode 202. Between the first pixel electrode portion 202a and the second pixel electrode portion 202b, the first recess 202d extends from the one side along the width direction of the pixel electrode 202 toward the bridging portion 202c.

Moreover, the second recess 202e is provided at the other side along the width direction of the pixel electrode 202. Between the first pixel electrode portion 202a and the second pixel electrode portion 202b, the second recess 202e extends from the other side along the width direction of the pixel electrode 202 toward the bridging portion 202c.

Moreover, the first recess 202d is not aligned in position with the second recess 202e along the width direction of the pixel electrode 202. Moreover, the width of the first recess 202d is set equal to the width of the second recess 202e. For example, the width of the first and second recesses 202d and 202e is set so as to fall within the range of e.g. 4.0 to 5.0 µm. To explain more specifically, one side of the first recess 202d that is closer to the second pixel electrode portion 202b is located nearer the thin film transistor 13 (i.e., nearer one end of the longitudinal direction of the pixel electrode 202) than is one side of the second recess 202e that is closer to the second pixel electrode portion 202b. Similarly, one side of the first recess 202d that is closer to the first pixel electrode portion 202a is located nearer the thin film transistor 13 than is one side of the second recess 202e that is closer to the first pixel electrode portion 202a. Conversely stated, one side of the second recess 202e that is closer to the second pixel electrode portion 202b is located more toward the opposite side from the thin film transistor 13 (i.e., nearer the other end of the longitudinal direction of the pixel electrode 202) than is one side of the first recess 202d that is closer to the second pixel electrode portion 202b. Moreover, one side of the second recess 202e that is closer to the first pixel electrode portion 202a is located more toward the opposite side from the thin film transistor 13 than is one side of the first recess 202d that is closer to the first pixel electrode portion 202a.

With the liquid crystal display panel of the above configuration, the bridging portion 202c and the first and second recesses 202d and 202e are provided between the first pixel electrode portion 202a and the second pixel electrode portion 202b, the bridging portion 202c overlapping the center line C201, whereby action and effects similar to those of the first embodiment are attained.

Moreover, the position of the first recess 202d and the position of the second recess 202e are not aligned along the width direction of the pixel electrode 202, whereby an enhanced effect of reducing the geometric area of dark lines can be obtained.

Figure 11:
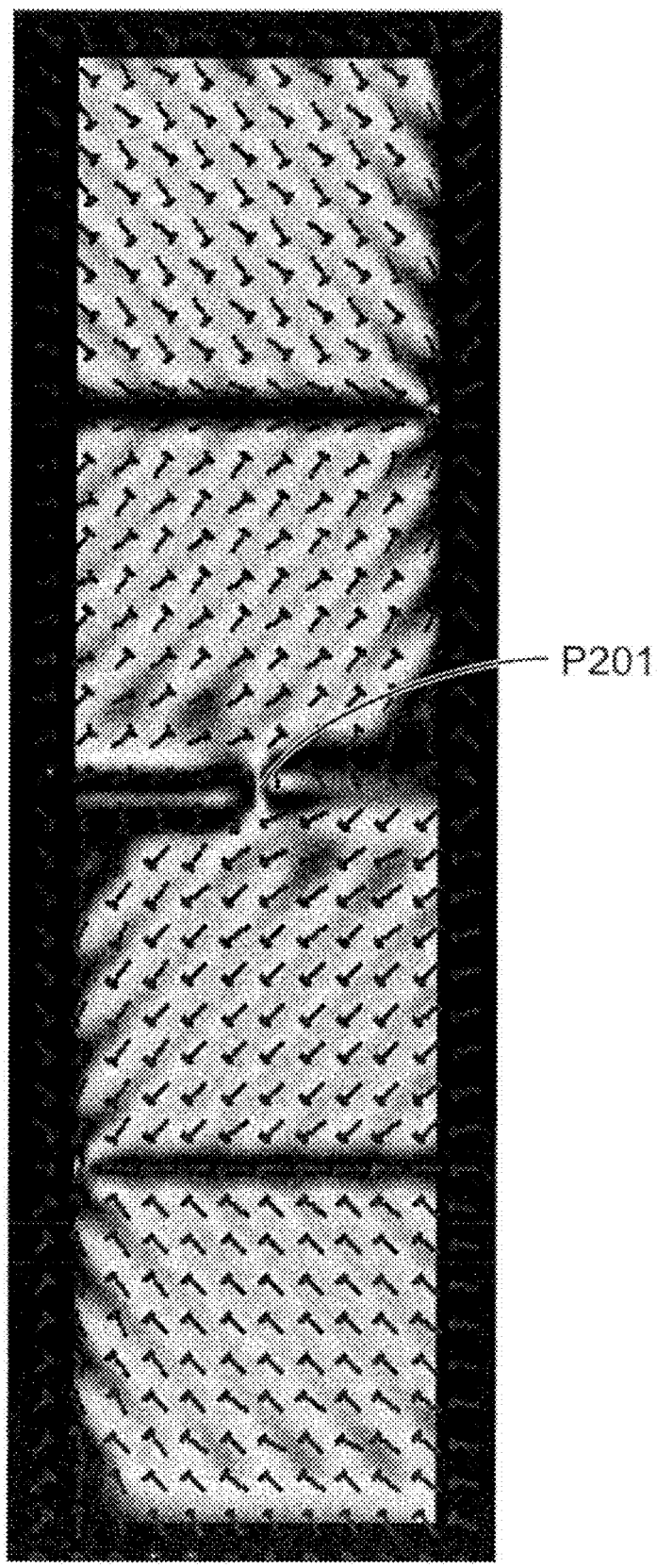
FIG. 11 A photographic representation of a simulation of dark lines in the second embodiment.

FIG. 11 is a photographic representation of one pixel of the second embodiment, illustrating a result of simulating occurrence of dark lines. In FIG. 11, liquid crystal molecules 41 under an applied voltage across the liquid crystal layer 30 are depicted as bolt shapes. More specifically, heads of the bolts correspond to bottoms of the cones in FIG. 2 and FIG. 3. On the other hand, ends of the bolts opposite to their heads, i.e., the tips, correspond to apices of the cones in FIG. 2 and FIG. 3.

It can be seen from FIG. 11 that a disclination P201 has occurred above the bridging portion 202c and that although the double dark line extends along the transverse direction of the pixel 101, an increase in the geometric area of this double dark line is suppressed.

Figure 12:
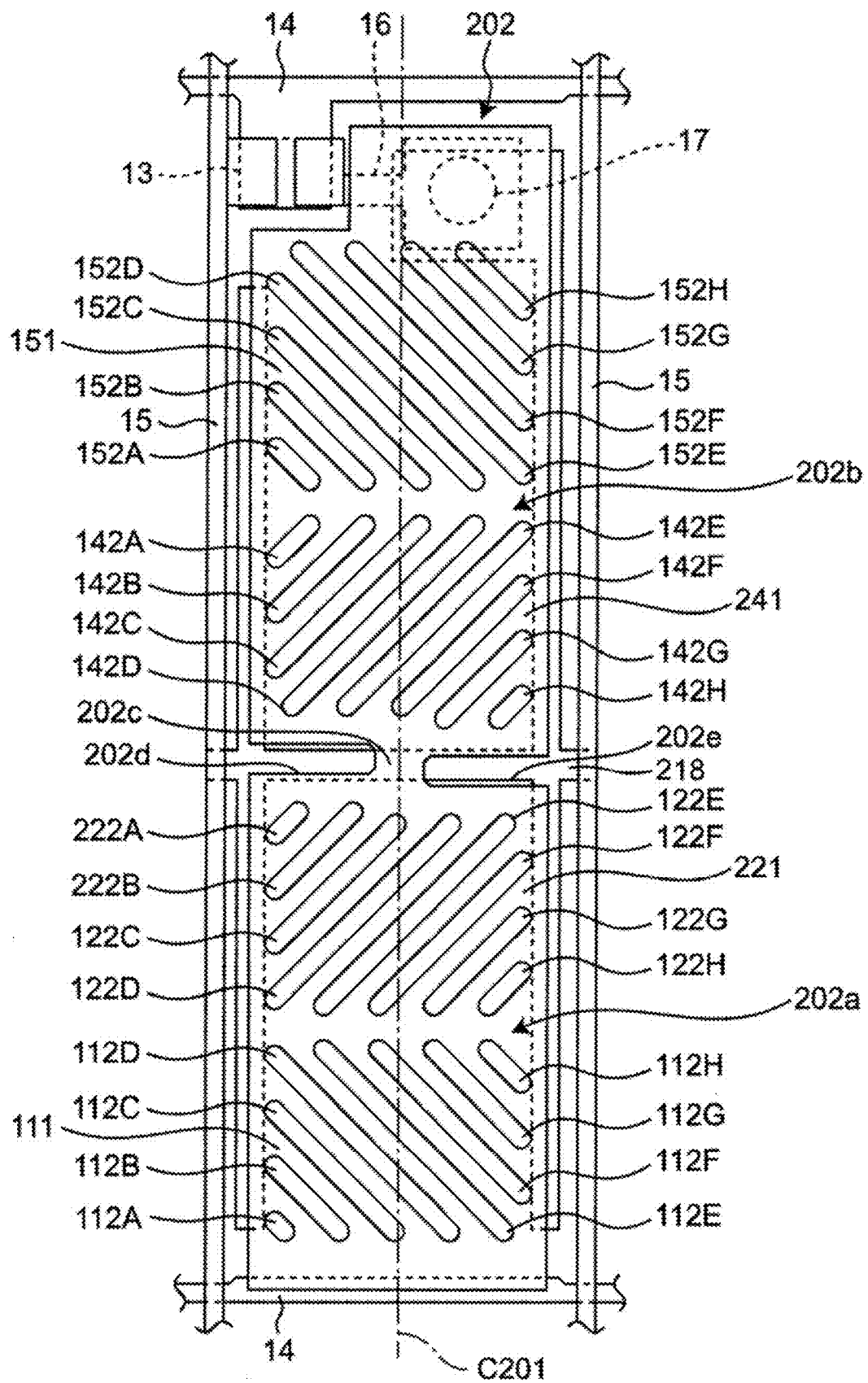
FIG. 12 An enlarged plan view of a pixel electrode according to a variation of the second embodiment and its neighborhood.
Figure 13:
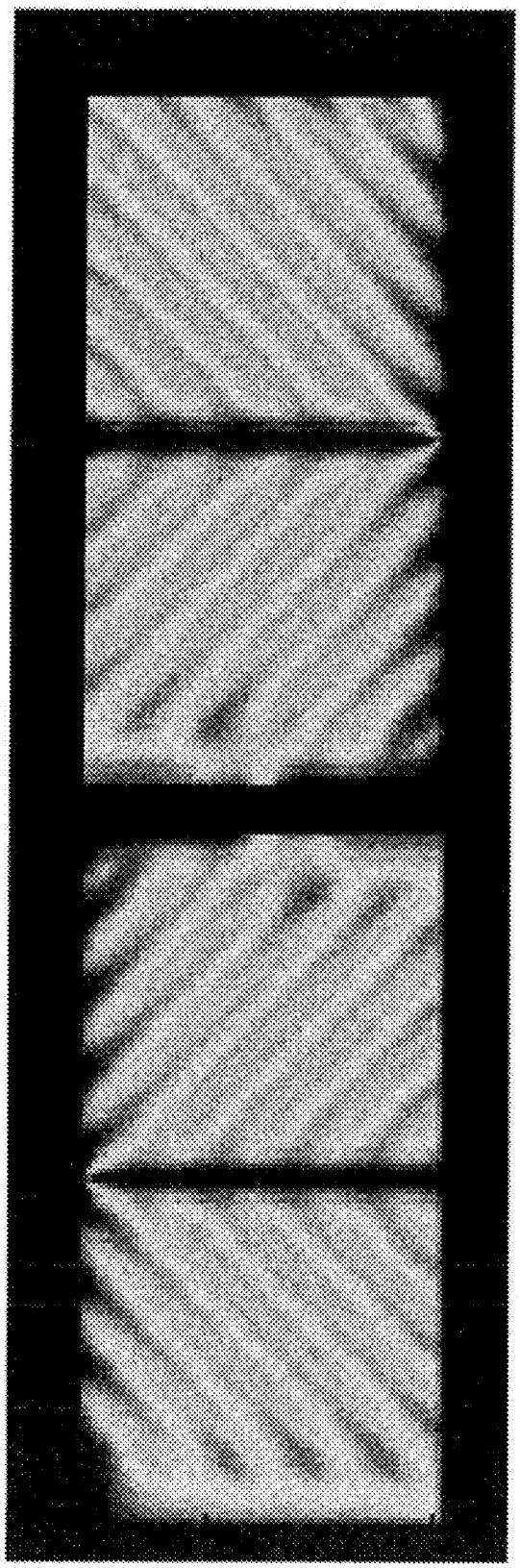
FIG. 13 A photographic representation of a simulation of dark lines in the aforementioned variation.
Figure 14:
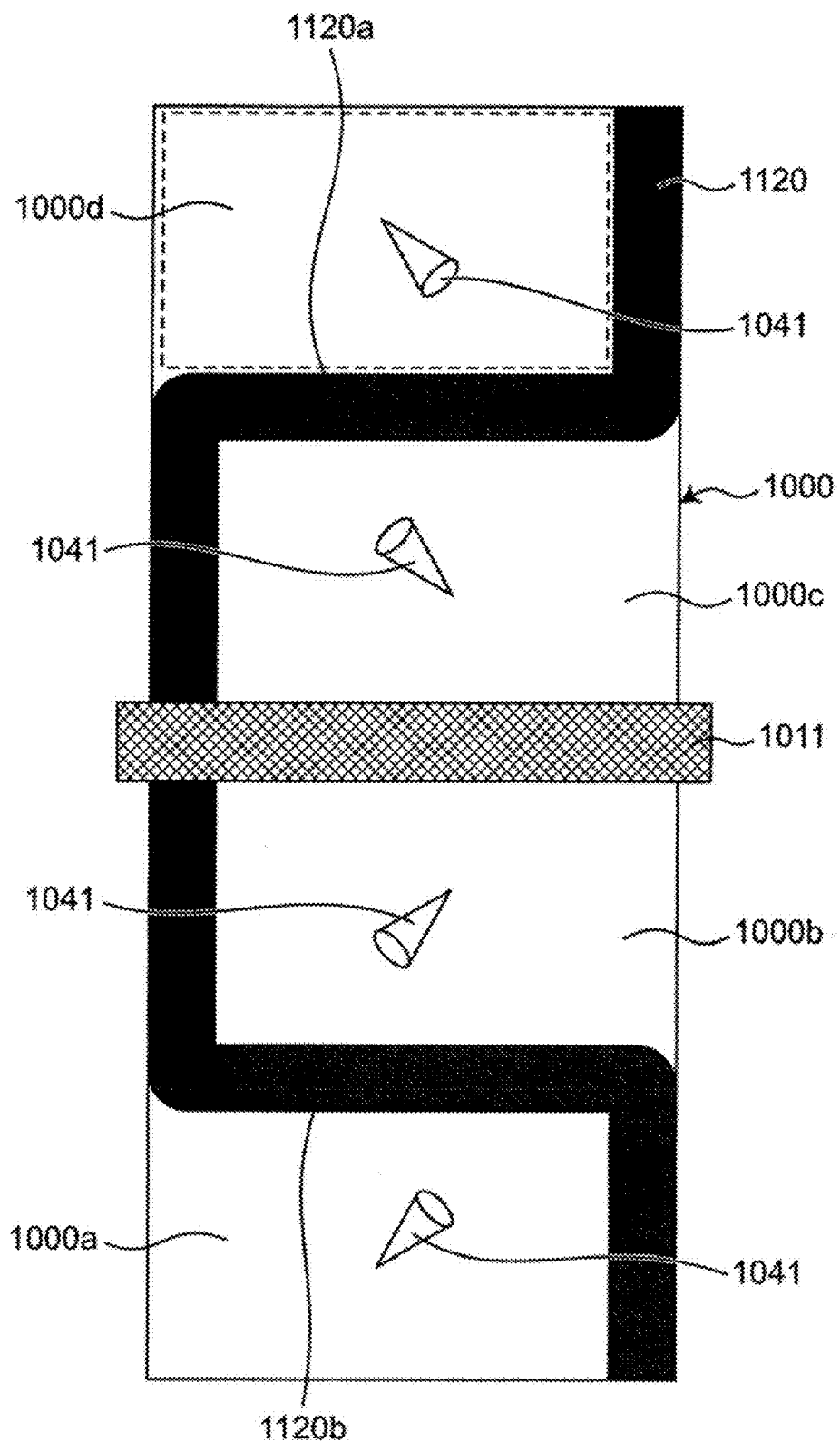
FIG. 14 A schematic plan view for describing a dark line in a conventional liquid crystal display panel.

The second embodiment illustrates that the capacitor line 18 is formed so as to overlap the end of the pixel electrode 202 that is closer to the thin film transistor 13; however, as shown in FIG. 12, a capacitor line 218 may be formed so as to overlap the bridging portion 202c and the first and second recesses 202d and 202e of the pixel electrode 202. When this is adopted, as shown in FIG. 13, transmittance will decrease relative to the second embodiment, but the longer distance between the gate line 14 and the capacitor line 218 allows for an enhanced producibility.

Although specific embodiments of this invention have been described, this invention is not to be limited to the above-described first and second embodiments and variations thereof; rather, this invention can be practiced with various alterations within its scope. For example, some of the details described in the first and second embodiments may be deleted or replaced to provide an embodiment of this invention. Moreover, alterations as described for the first embodiment may be applied to the second embodiment to provide an embodiment of this invention.

Moreover, description of Japanese Patent No. 5184618, Japanese Laid-Open Patent Publication No. 2011-85738, and International Publication No. 2017/047532 is also applicable to the liquid crystal display panel of this invention. For example, as examples of materials and production methods of liquid crystal display panels according to this invention, the materials and production methods, etc., described in Japanese Patent No. 5184618 Japanese Laid-Open Patent Publication No. 2011-85738, and International Publication No. 2017/047532 can be adopted.

That is, the above disclosure can be summarized as follows.

A liquid crystal display panel according to one implementation of this invention is a liquid crystal display panel having a display mode that is a VA mode, comprising:

a plurality of rectangular-shaped pixels 101;

a first substrate section 10 including a first substrate 11 and pixel electrodes 102, 202;

a liquid crystal layer 30 provided on the first substrate section 10, the liquid crystal layer 30 containing liquid crystal molecules 41; and a second substrate section 50 provided on the liquid crystal layer 30, the second substrate section 50 including a second substrate 51 and a counter electrode 103, wherein, the plurality of pixels 101 each include a first domain 101a, a second domain 101b, a third domain 101c, and a fourth domain 101d arranged along a longitudinal direction of the pixel 101, when a direction orthogonal to the longitudinal direction of the pixel 101 is defined as a transverse direction of the pixel 101 and an azimuth flush with this transverse direction is defined as 0°, an alignment azimuth of the liquid crystal molecules 41 in the second domain 101b is substantially 225° and an alignment azimuth of the liquid crystal molecules 41 in the third domain 101c is substantially 45°; or an alignment azimuth of the liquid crystal molecules 41 in the second domain 101b is substantially 315° and an alignment azimuth of the liquid crystal molecules 41 in the third domain 101c is substantially 135°, each pixel electrode 102, 202 includes a first pixel electrode portion 102a, 202a facing the first and second domains 101a, 101b in a thickness direction of the pixel electrode 102, 202, a second pixel electrode portion 102b, 202b facing the third and fourth domains 101c, 101d in the thickness direction of the pixel electrode 102, 202, and a bridging portion 102c, 202c being provided between the first pixel electrode portion 102a, 202a and the second pixel electrode portion 102b, 202b and linking together the first pixel electrode portion 102a, 202a and the second pixel electrode portion 102b, 202b;

a first recess 102d, 202d is provided at one side along a width direction of the pixel electrode 102, 202, the first recess 102d, 202d extending from the one side along the width direction of the pixel electrode 102, 202 toward the bridging portion 102c, 202c and being located between the first pixel electrode portion 102a, 202a and the second pixel electrode portion 102b, 202b; and a second recess 102e, 202e is provided at another side along the width direction of the pixel electrode 102, 202, the second recess 102e, 202e extending from the other side along the width direction of the pixel electrode 102, 202 toward the bridging portion 102c, 202c and being located between the first pixel electrode portion 102a, 202a and the second pixel electrode portion 102b, 202b.

With the above configuration, the first recess 102d, 202d is provided at one side along the width direction of the pixel electrode 102, 202. The first recess 102d, 202d extends from one side along the width direction of the pixel electrode 102, 202 toward the bridging portion 102c, 202c, and is located between the first pixel electrode portion 102a, 202a and the second pixel electrode portion 102b, 202b. On the other hand, the second recess 102e, 202e is provided at the other side along the width direction of the pixel electrode 102, 202. The second recess 102e, 202e extends from the other side along the width direction of the pixel electrode 102, 202 toward the bridging portion 102c, 202c, and is located between the first pixel electrode portion 102a, 202a and the second pixel electrode portion 102b, 202b. In other words, regarding the bridging portion 102c, 202c, the first recess 102d, 202d is provided at one side along the width direction of the pixel electrode 102, 202, and the second recess 102e, 202e is provided at the other side along the width direction of the pixel electrode 102, 202. As a result, when a voltage is applied to the liquid crystal layer 30, the geometric area of dark lines occurring near the boundary between the second domain 101b and the third domain 101c can be reduced. Therefore, the aforementioned pixel 101 can attain an adequate transmittance with a simple configuration.

In a liquid crystal display panel according to one embodiment, when a center line C101, C201 which extends along the longitudinal direction of the pixel 101 and which passes through a center of the width direction of the pixel electrode 102, 202 is defined, the bridging portion 102c, 202c overlaps the center line C101, C201.

According to the above embodiment, because the bridging portion 102c, 202c overlaps the center line C101, C201, variation in the sites of occurrence of a disclination P101, P201 in the dark line(s) can be suppressed.

In a liquid crystal display panel according to one embodiment, the first recess 202d is not aligned in position with the second recess 202e along the width direction of the pixel electrode 202.

According to the above embodiment, because the position of the first recess 202d and the position of the second recess 202e are not aligned along the width direction of the pixel electrode 202, an enhanced effect of reducing the geometric area of dark lines can be obtained.

REFERENCE SIGNS LIST first substrate section,
11 first glass substrate
20 first vertical alignment film
30 liquid crystal layer
41 liquid crystal molecule
40 second vertical alignment film
50 second substrate section
51 second glass substrate
90 sealing member
101 pixel
101a, 101b, 101c, 101d domain
102, 202 pixel electrode
103 counter electrode
102a, 202a first pixel electrode portion
102b, 202b second pixel electrode portion
102c, 202c bridging portion
102d, 202d first recess
102e, 202e second recess
111, 141, 211, 241 first slitted region
112A to 112H, 122A to 122H, 142A to 142H, 152A to 152H, 222A, 222B, 242G, 242H slit
121, 152, 221, 252 second slitted region
C101, C201 center line
P101, P201, P2101 disclination

The invention claimed is:

1. A liquid crystal display panel having a display mode that is a VA mode, comprising:
a plurality of rectangular-shaped pixels;
a first substrate section including a first substrate and pixel electrodes;
a liquid crystal layer provided on the first substrate section, the liquid crystal layer containing liquid crystal molecules; and
a second substrate section provided on the liquid crystal layer, the second substrate section including a second substrate and a counter electrode, wherein,
the plurality of pixels each include a first domain, a second domain, a third domain, and a fourth domain arranged along a longitudinal direction of the pixel,
when a direction orthogonal to the longitudinal direction of the pixel is defined as a transverse direction of the pixel and an azimuth flush with the transverse direction of the pixel is defined as 0°, an alignment azimuth of the liquid crystal molecules in the second domain is substantially 225° and an alignment azimuth of the liquid crystal molecules in the third domain is substantially 45°, or an alignment azimuth of the liquid crystal molecules in the second domain is substantially 315° and an alignment azimuth of the liquid crystal molecules in the third domain is substantially 135°,
each pixel electrode includes
a first pixel electrode portion facing the first and second domains in a thickness direction of the pixel electrode,
a second pixel electrode portion facing the third and fourth domains in the thickness direction of the pixel electrode,
a bridging portion being provided between the first pixel electrode portion and the second pixel electrode portion and linking together the first pixel electrode portion and the second pixel electrode portion,
a first recess being provided at one side along a width direction of the pixel electrode, the first recess extending toward the bridging portion along the width direction of the pixel electrode and being located between the first pixel electrode portion and the second pixel electrode portion, and
a second recess being provided at another side along the width direction of the pixel electrode, the second recess extending toward the bridging portion along the width direction of the pixel electrode and being located between the first pixel electrode portion and the second pixel electrode portion,
when a center line which extends along the longitudinal direction of the pixel and which passes through a center of the width direction of the pixel electrode is defined, the bridging portion overlaps the center line,
the first recess is not aligned in position with the second recess along the width direction of the pixel electrode.

* * * * *